United States Patent [19]
Cabagnero

[11] Patent Number: 6,126,234
[45] Date of Patent: Oct. 3, 2000

[54] PORTABLE BABY SEAT

[75] Inventor: Ramón Jane Cabagnero, Palau de Plegamans, Spain

[73] Assignee: Jane, S.A., Spain

[21] Appl. No.: 09/437,919

[22] Filed: Nov. 10, 1999

[30] Foreign Application Priority Data

Nov. 10, 1998 [ES] Spain ................................ 9802818 U

[51] Int. Cl.[7] .................................................. A47C 1/08
[52] U.S. Cl. .................. 297/256.13; 297/316; 297/250.1
[58] Field of Search .......................... 297/250.1, 256.13, 297/256.1, 316, 319, 320, 321, 83

[56] References Cited

U.S. PATENT DOCUMENTS

| | | | |
|---|---|---|---|
| 2,433,521 | 12/1947 | Lorenz | 297/83 |
| 3,059,968 | 10/1962 | Schliephacke | 297/321 |
| 4,205,877 | 6/1980 | Ettridge | 297/321 |
| 4,636,002 | 1/1987 | Genjiro | 297/319 |
| 5,115,523 | 5/1992 | Cone | 297/256.13 |
| 5,378,038 | 1/1995 | Koyanagi et al. | 297/256.13 |

FOREIGN PATENT DOCUMENTS 1164434  5/1958  France ................................. 297/319

*Primary Examiner*—Peter M. Cuomo
*Assistant Examiner*—David E. Allred
*Attorney, Agent, or Firm*—Steinberg & Raskin, P.C.

[57] ABSTRACT

A portable baby seat is provided having a front member, a back member and a seat. The seat is hingedly coupled at its back edge in to an interior bottom surface of the front member. The seat is also coupled to a front region of the back member by a link which is hingedly coupled to the seat and extends therefrom. The link is secured to a point located on the front region of the back member, the point being eccentrically arranged with respect to the hinge axis of the hinged connection between the front and back members of the baby seat. The hinged connection between the front and back members of the baby seat is provided with a bolt to limit its swinging arc in order to thus protect the baby against an excessive approach between seat and back member.

8 Claims, 1 Drawing Sheet

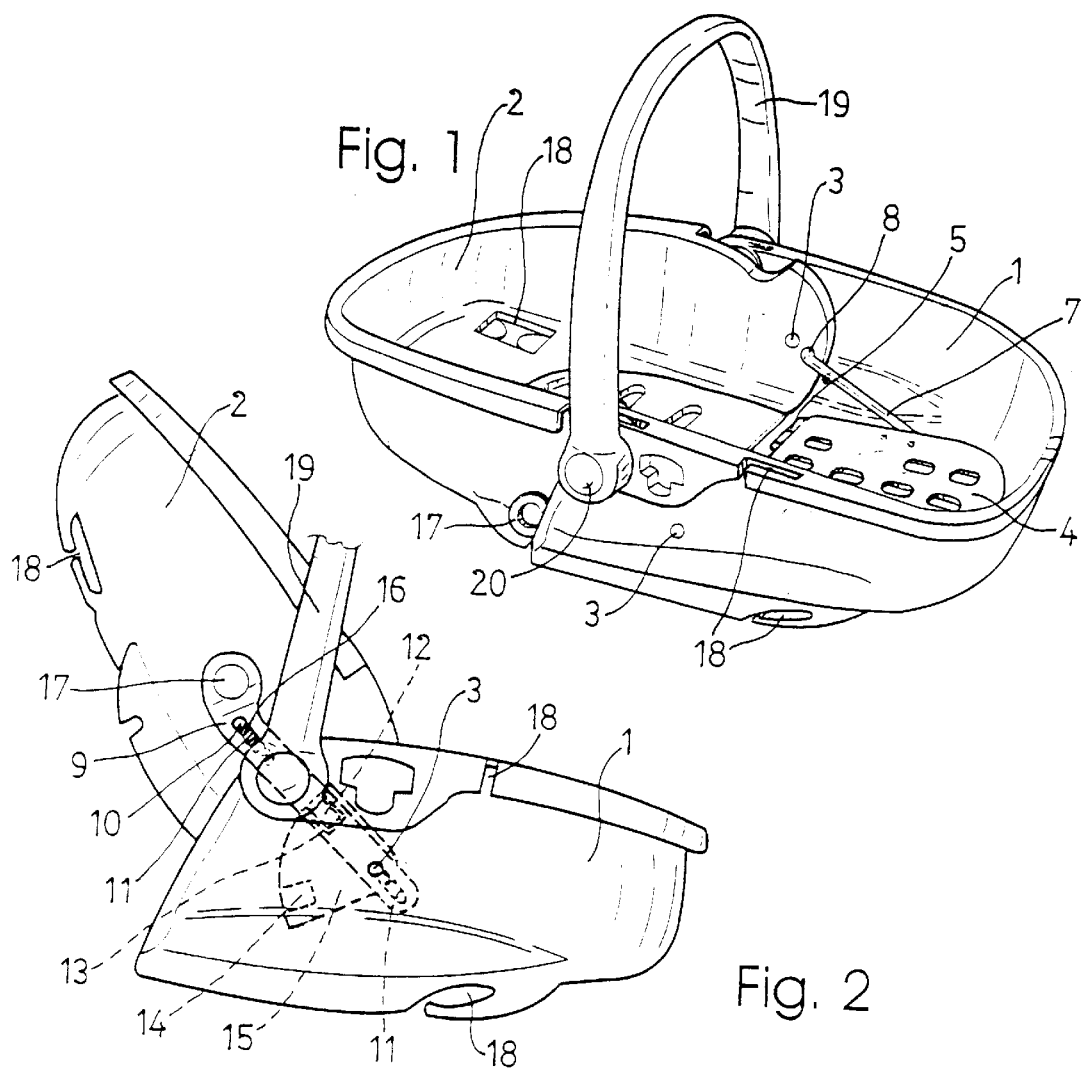
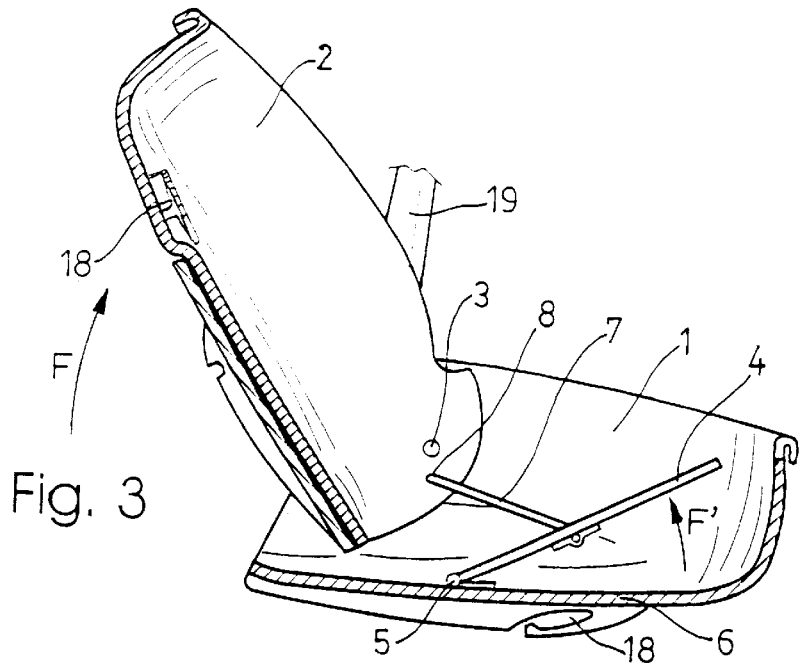

PORTABLE BABY SEAT

FIELD OF THE INVENTION

The present invention relates to a portable baby seat, and in particular to a baby seat having a first mode wherein the baby seat is adapted to be used as a seat and a second mode wherein the baby seat is adapted to be used as a bed.

BACKGROUND OF THE INVENTION

Baby seats are already known which are adapted to be converted into portable baby beds (carrycots). Baby seats of this type generally include a seat and a back coupled to the seat in a hinged fashion permitting the recline of the back relative to the seat.

Other baby seats are known which are formed of three members, namely a front member, a back member, and a seat. In this type of baby seat the front and back members are linked to each other in a hinged fashion and the seat is operably coupled to the front member.

OBJECTS AND SUMMARY OF THE INVENTION

It is the object of the present invention to improve the construction of this latter type of baby seat by providing it with simple, practical and efficient means to obtain a juxtaposed arrangement of the seat relative to the front and back members when the baby seat is being used as a bed while also enabling the seat to adopt different inclinations when the back member of the seat is arranged in differently inclined positions when the baby seat is being used as a seat.

Accordingly, a portable baby seat is provided having a front member, a back member and a seat. The seat is hingedly coupled at its back edge into an interior bottom surface of the front member. The seat is also coupled to a front region of the back member by a link which is hingedly coupled to the seat and extends therefrom. The link is secured to a point located on the front region of the back member, the point being eccentrically arranged with respect to the hinge axis of the hinged connection between the front and back members of the baby seat.

The hinged connection between the front and back members of the baby seat is provided with means to limit its swinging arc in order to thus protect the baby against an excessive approach between seat and back.

BRIEF DESCRIPTION OF THE DRAWINGS

These and other objects and advantages will readily understood by reference to the following detailed description of the invention when considered in connection with the accompany drawings in which:

In the drawings:

FIG. 1 is a perspective view of the portable baby seat according to the present invention;

FIG. 2 is a side elevation view of the portable baby seat according to the present invention when the baby seat is arranged as a seat; and FIG. 3 is sectional view of the portable baby as depicted in FIG. 2.

DETAILED DESCRIPTION OF THE DRAWINGS

Referring to the accompanying drawings wherein like reference characters designate identical or corresponding parts throughout the several views, the portable baby seat in accordance with the present invention is formed by two members namely being a front member 1 and a back member 2, the members being linked to each other in a hinged connection by means of two lateral pins 3 each of which is located along a respective side of the portable baby seat. As shown, the front member is fitted with a seat 4.

The seat 4 is formed by a plate having front and rear edges and an intermediate region located between the front and back edges. The plate is coupled along its rear edge to the front member 1 by means of hinges 5. As shown, the hinges 5 are secured to the bottom interior surface 6 of the front member 1 at a location substantially in the middle of the front member.

The seat 4, that is the plate, is linked at its intermediate region through a pair of lateral links 7, each of the lateral links 7 being located on a respective side of the seat 4.

As shown in the figures, each of the lateral links 7 is secured at a first end to a point 8 of the front region of the back member 2. The point 8 is eccentrically arranged with respect to the pin 3 linking the front member 1 and back member 2 to each other. Each of the lateral links 7 is hingedly coupled at a second end to seat 4 at a location substantially intermediately located between the front and rear edges of the seat.

With this arrangement, when the back member 2 is arranged as an extension of the front member 1 and on the same plane as the latter (FIG. 1), the seat 4 is arranged in a juxtaposed arrangement on the bottom 6 of said front member thus allowing the use of the portable baby seat as a portable baby bed (carrycot).

When the back member 2 is raised by means of swinging it up around the pins 3 (arrow F, FIG. 3) the links 7 act to raise the seat 4 as per arrow F'. The back member 2 and seat 4 being thus arranged in an inclined arrangement serve to convert the portable baby seat into a seat wherein the back member 2 serves as a seat back.

At the hinged connection between the front and back members of the portable baby seat according to the present invention, means are provided to limit the swinging arc of the front and back members relative to one another. The means for limiting the swinging arc comprises a bolt 9 which is guided on pin 3 and on a knob 10 located on an outer surface of the member 2. The pin 3 and knob 10 are engaged by means of respective slots 11 located at each end of the bolt 9. The bolt 9 is provided with a catch 12 adapted to be selectively engaged into one of two sockets 13 and 14 provided at the opposite ends of a sector-shaped part 15 integral with the side of the front member 1.

The bolt 9 is fitted with a spring 16 that keeps it in its locked position, and at its rear end said bolt 9 is provided with a grip 17. The grip 17 allows an attendant to apply a force to the bolt 9 overcoming the resistance of the spring in order to enable the selective positioning of the catch 12 in its engaged arrangement from one socket to the other.

The portable baby seat according to the present invention is provided with several attachments 18 allowing the securement of the seat to seat belts in the back seat of an automobile.

The baby seat is completed with a rigid handle 19 in the shape of an inverted U linked at its ends in a hinged connection to the sides of the front member 1 of the carrycot, said handle being retained in its folded and service positions with means provided at its hinge ends 20.

This portable baby seat will of course include soft upholstery (not shown) removably fitted in order to allow to replacement or washing of the same.

The examples of the present invention provided above are not meant to be exclusive. Many other variations of the present invention would be obvious to those skilled in the art, and are contemplated to be within the scope of the appended claims.

I claim:

1. A portable baby seat comprising:

a front member;

a back member coupled to said front member by a hinge connection defining a hinge axis, said hinge connection permitting the arcuate movement of said front and back members relative to one another;

a seat member having a rear edge, a front edge and a intermediate region between said front and rear edges;

means for hingedly coupling said seat member at said rear edge to an interior bottom surface of said front member;

means for liking said seat member at said intermediate region to a point on said back member eccentrically arranged with respect to said hinge axis;

wherein said front member comprises a continuous shell defining said interior bottom surface and having a pair of opposed sidewalls extending upwardly from said interior bottom surface on opposite sides of the seat member.

2. The portable baby seat according to claim 1, further comprising means for limiting the arcuate movement of said front and back members.

3. The portable baby seat according to claim 2, wherein said means for limiting the arcuate movement of said front and back members comprises a bolt having a first end operably coupled to an outer surface of said back member and a second end operably coupled to said front member.

4. The portable baby seat according to claim 3, wherein said first end of said bolt is provided with a first slot structured and arranged to engage a knob located on an outer surface of said back member.

5. The portable baby seat according to claim 4, wherein said second end of said bolt is provided with a second slot structured and arranged to engage said hinge connection.

6. The portable baby seat according to claim 5, wherein said bolt is provided with a catch structured and arranged to selectively engage one of two sockets provided in a sector shaped part integral with the sides of the front member.

7. The portable baby seat according to claim 1, wherein said means for linking comprises a pair of lateral links, each of said lateral links having a first end secured to said point on said back member eccentrically arranged with respect to said hinge axis and a second end hingedly coupled to said seat.

8. The portable baby seat according to claim 7, wherein said second end is hingedly coupled to said seat at a location substantially intermediately located between said front and rear edges of said seat.

* * * * *